US005639256A

United States Patent [19]
Endo et al.

[11] Patent Number: 5,639,256
[45] Date of Patent: Jun. 17, 1997

[54] FEEDER CONNECTOR

[75] Inventors: Takayoshi Endo; Shigemitsu Inaba; Hirotaka Fukushima; Shigemi Hashizawa; Satoki Masuda, all of Shizuoka, Japan

[73] Assignee: Yazaki Corporation, Tokyo, Japan

[21] Appl. No.: 398,087

[22] Filed: Mar. 3, 1995

[30] Foreign Application Priority Data

Mar. 17, 1994 [JP] Japan .................................. 6-046754

[51] Int. Cl.⁶ .................................................. H01R 13/627
[52] U.S. Cl. ........................................... 439/358; 439/353
[58] Field of Search ................................ 439/350–354, 439/357, 358, 488, 491, 188, 911, 310, 465, 252

[56] References Cited

U.S. PATENT DOCUMENTS

| | | | |
|---|---|---|---|
| 4,707,045 | 11/1987 | Ney et al. | 439/252 |
| 4,789,343 | 12/1988 | Dougherty et al. | 439/358 |
| 4,838,808 | 6/1989 | Fujiura | 439/357 |
| 4,917,627 | 4/1990 | Hendricks | 439/357 |
| 5,350,312 | 9/1994 | Kuno et al. | 439/310 |

FOREIGN PATENT DOCUMENTS 50-95790  7/1975  Japan .

OTHER PUBLICATIONS

S.N. 08/165,827, filed Dec. 14, 1993.
S.N. 08/305,656, filed Sep. 14, 1994.

Primary Examiner—Hien Vu
Attorney, Agent, or Firm—Armstrong, Westerman, Hattori, McLeland & Naughton

[57] ABSTRACT

The feeder connector is designed to prevent incomplete engagement of the feeding and receiving side connectors and to facilitate connection work when charging an electric car. The feeder connector comprises a feeding side connector A on the power supply apparatus side and a receiving side connector B on the car body side. The feeding side connector A has a connector body 1, a protective case 2 and a lock lever 12. The protective case 2 consists of a main case 2A made up of a cylinder portion 3, a half-cylinder portion 4 and a trough portion 5, all formed integral, and a subcase 2B. The connector body 1 is formed integral with the cylinder portion 3 of the main case 2A through a flange 19 formed along the periphery of the body. An opening 11 is formed ranging from the cylinder portion 3 of the main case 2A to the subcase 2B. In this opening 11, a lock lever 12 for the receiving side connector B is rotatably provided.

4 Claims, 12 Drawing Sheets

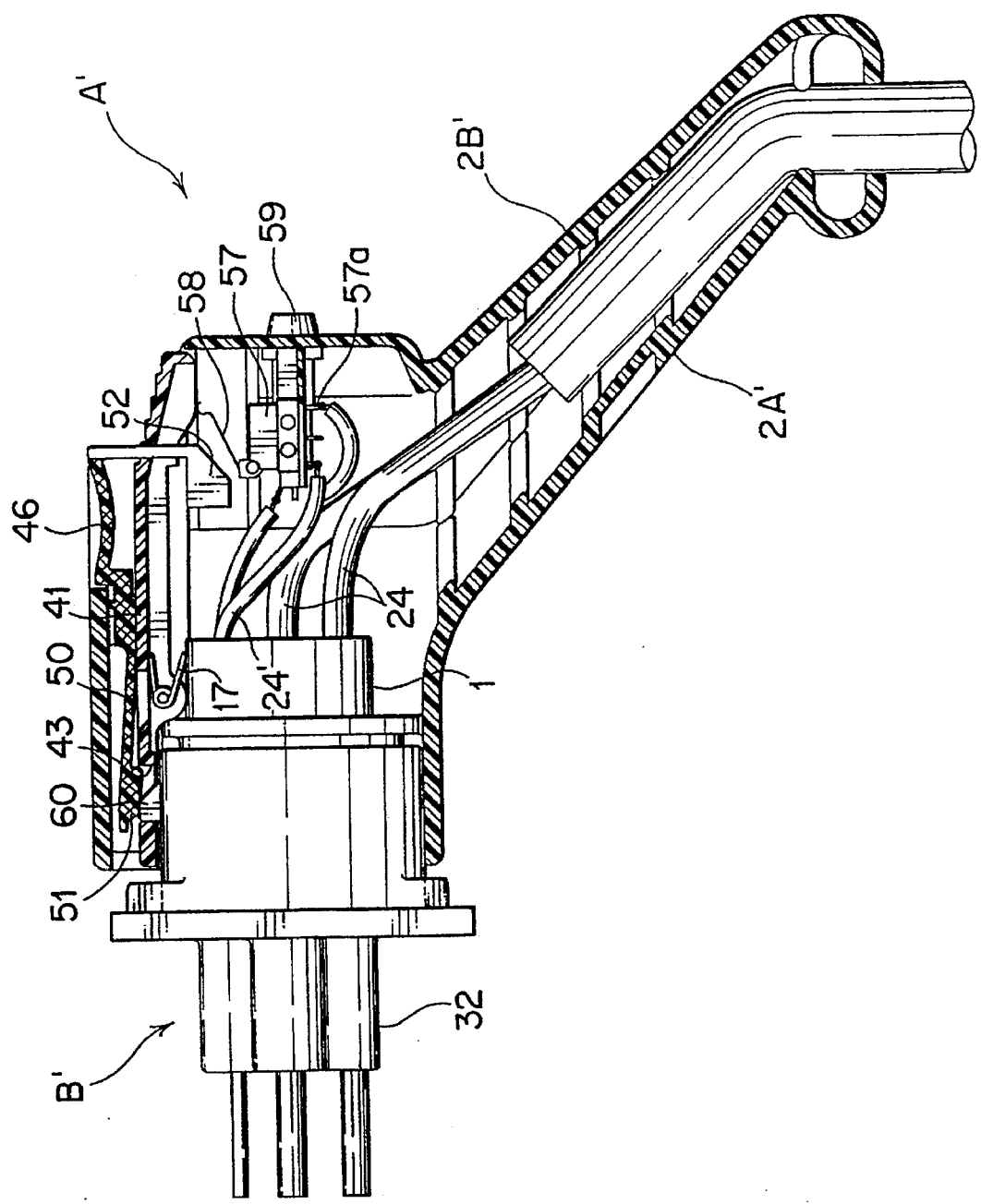

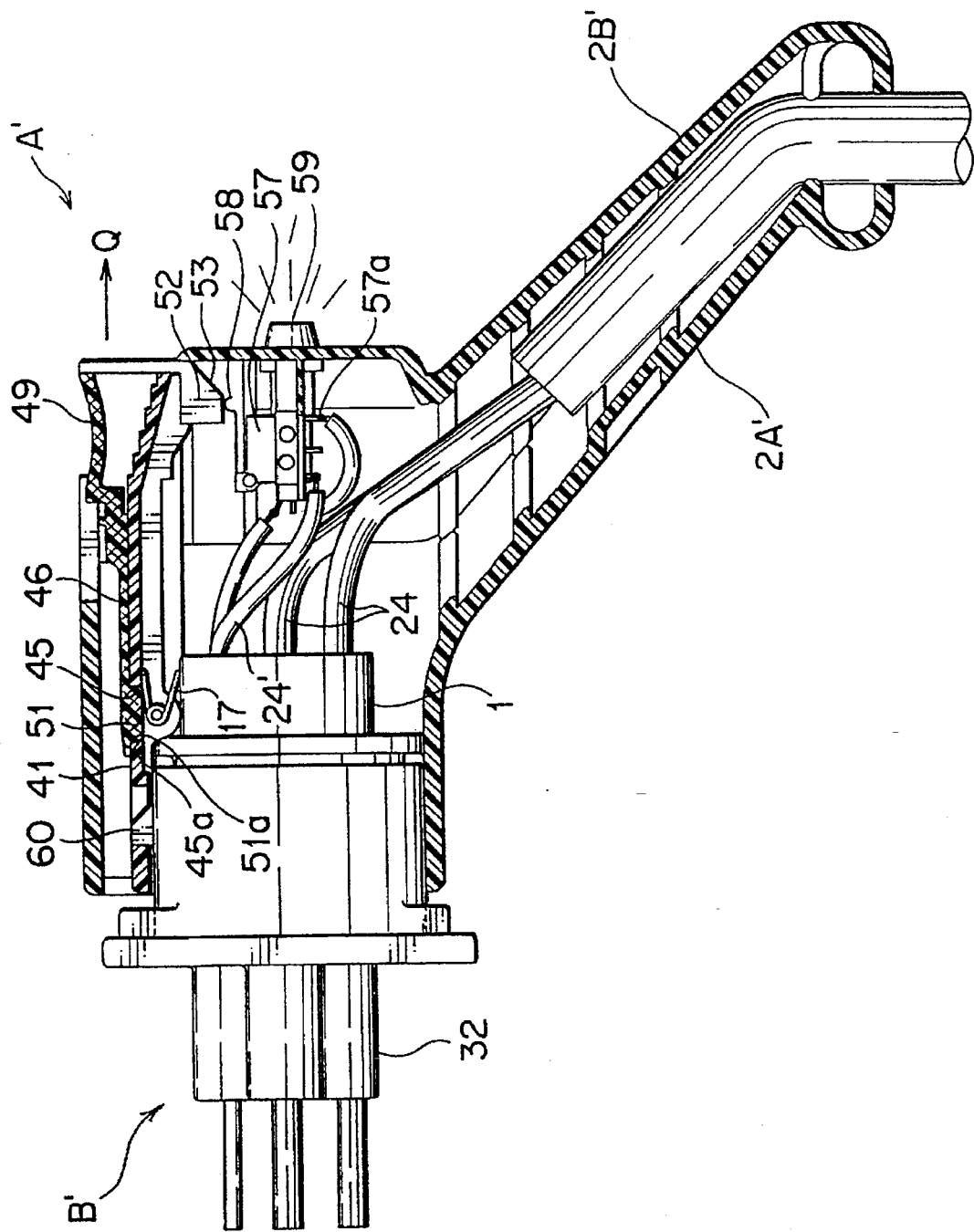

FEEDER CONNECTOR

BACKGROUND OF THE INVENTION

1. Field of the Invention

The present invention relates to a feeder connector used to charge a battery of electric cars and intended to prevent improper engagement during the process of connecting a feeding side connector and a receiving side connector and to improve the work efficiency of connecting these connectors.

2. Description of the Prior Art

FIGS. 12 and 13 show one example of a conventional feeder connector (disclosed in Japan Patent Preliminary Publication No. Showa 50-95790).

This feeder connector consists of a female connector (receiving side connector) 71 fixed to a car body and a male connector (feeding side connector) 72 installed on the side of a power supply apparatus. This feeder connector employs a so called, "bayonet lock system", in which the male connector 72 is engaged and connected to the female connector 71 by fitting a hood 75 of the female connector 71 into a gap between a housing body 73 of the male connector 72 and a coupling nut 74 fitted over the outer circumference of the housing body 73, and by rotating the coupling nut 4 to cause a stud 76 on the inner circumferential surface of the coupling nut 74 to advance into a spiral groove 77 formed on the outer circumference of the hood. At the terminal end of the spiral groove 77 is formed a dent 77a, in which the stud 76 engages, locking the mating connectors. In the figure, denoted 78 are male terminals, 79 female terminals, 80 a spring, and 81 a gasket. The spring 80 urges the housing body 73 toward the female connector 71 side.

SUMMARY OF THE INVENTION

With the feeder connector that uses the conventional bayonet lock system, there is a possibility that the coupling nut 74 may be stopped while being rotated for locking during the process of connecting the female and male connectors 71, 72. It is difficult to decide at a glance whether the connectors are completely connected or not. To lock the coupling nut 74, it has to be rotated in the direction of fastening, so that the connection work is no easy task and is time-consuming.

The present invention has been accomplished in light of the above-mentioned drawback to provide a feeder connector, which can reliably prevent an incomplete connection and allow a simple one-touch connection and disconnection of the female and male connectors.

According to a first aspect of this invention, the feeder connector of this invention comprises:

a feeding side connector installed on a power supply apparatus side; and a receiving side connector installed on a car body side; wherein the feeding side connector comprises:

a connector body accommodating a plurality of terminals;

a protective case accommodating the connector body; and a lock lever for the receiving side connector;

wherein the protective case comprises:

a main case including a cylinder portion accommodating the connector body, a half-cylinder portion formed integral with the cylinder portion and having its upper half open, and a trough portion extending integrally from the half-cylinder portion at an angle;

a subcase covering the half-cylinder portion and the trough portion; and an opening ranging from the cylinder portion of the main case; and wherein the connector body is integrally formed with the cylinder portion of the main case through a flange formed along the periphery of the connector body, and the lock lever for the receiving side connector is provided in the opening.

According to a second aspect of this invention, it is preferred that the main case is formed with an arch-shaped slider accommodating chamber enclosing the opening; that a slider is mounted in the slider accommodating chamber so that the slider can be advanced or retracted relative to the lock lever between a preliminary locked position and a fully locked position; and that a preliminary engagement means that engages when the feeding and receiving side connectors are incompletely engaged and a full locking means that engages when they are completely engaged are provided between the lock lever and the slider.

According to a third aspect of this invention, it is further preferred that the protective case is provided with a switching means that is turned on by the slider moving to the fully locked position and also with an indication means that blinks upon reception of a switch signal from the switching means.

According to the first aspect of this invention, the engagement and disengagement between the feeding side connector and the receiving side connector can be done easily by using the handle (trough portion and trough cover portion) of the protective case. Because the lock lever can be seen from outside, whether the connectors are completely engaged and locked can be checked easily. The protective case for the feeding side connector is divided into the main case and the subcase, so that assembly work, such as inserting terminals into the connector body and drawing their connected wires out of the connector body, can be performed with ease.

According to the second aspect of this invention, the slider that moves between the preliminary locked position and the fully locked position makes easy the check on complete engagement and locking between the two connectors, thus reliably preventing incomplete connection. Further, according to the third aspect of this invention, the use of this slider to activate the switching means allows electric detection of the full engagement and locking.

BRIEF DESCRIPTION OF THE DRAWINGS

FIG. 9 is a vertical cross section showing the process of engagement between the feeding side connector A' and the receiving side connector B';

FIG. 10 is a vertical cross section of FIG. 9 showing the connectors fully engaged;

DETAILED DESCRIPTION OF PREFERRED EMBODIMENT

Figure 1:
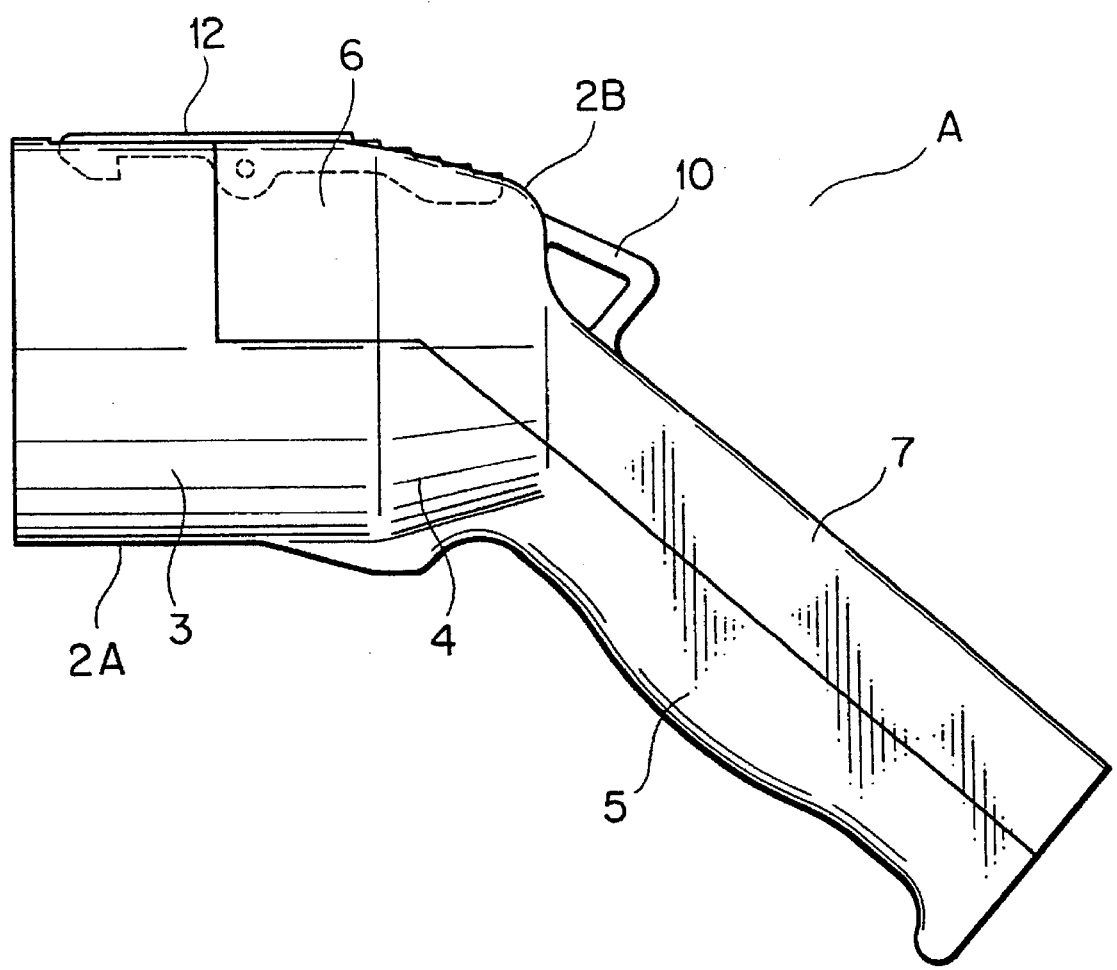
FIG. 1 is a front view of a feeding side connector A in the feeder connector as a first embodiment of this invention.
Figure 2:
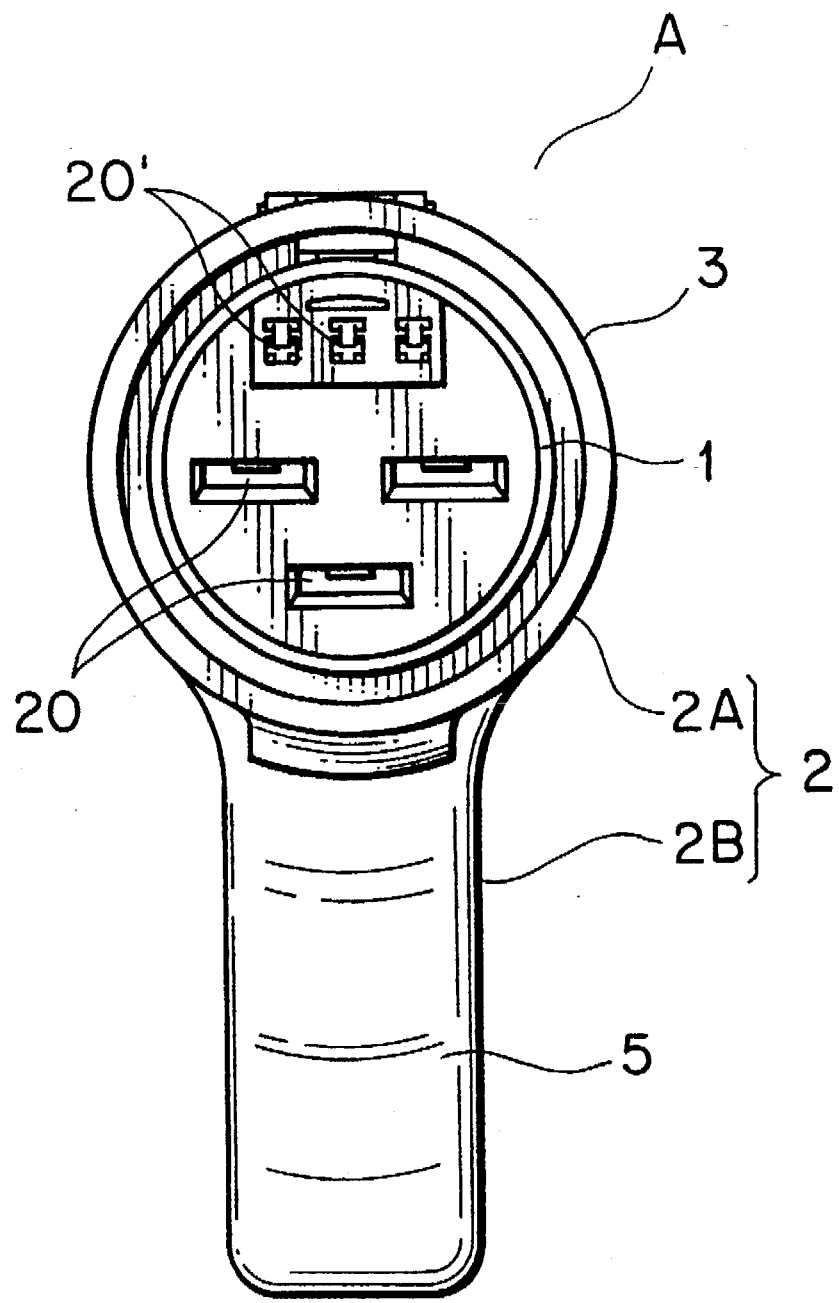
FIG. 2 is a left-hand side view of FIG. 1.
Figure 3:
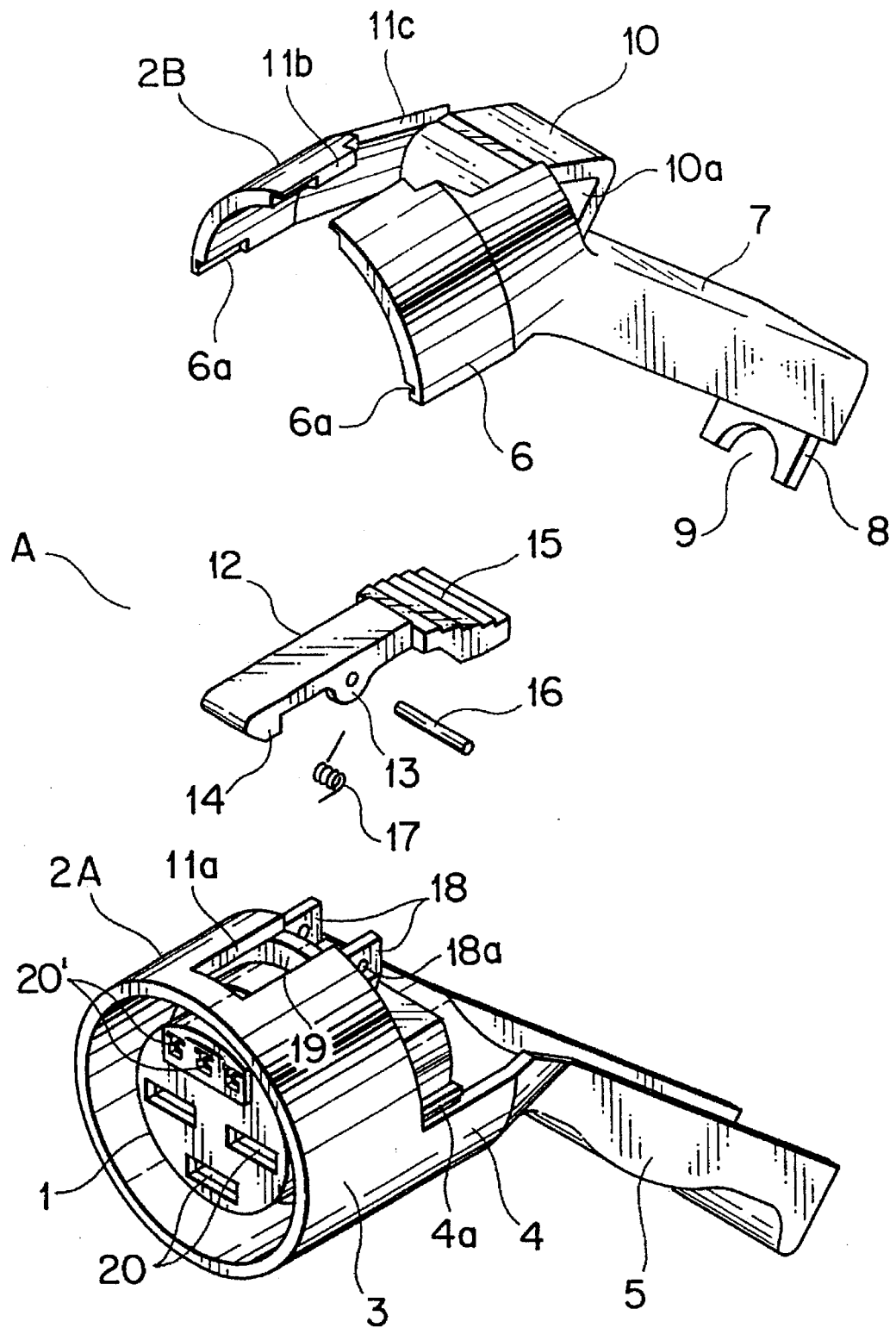
FIG. 3 is an exploded perspective view of FIG. 1.
Figure 4:
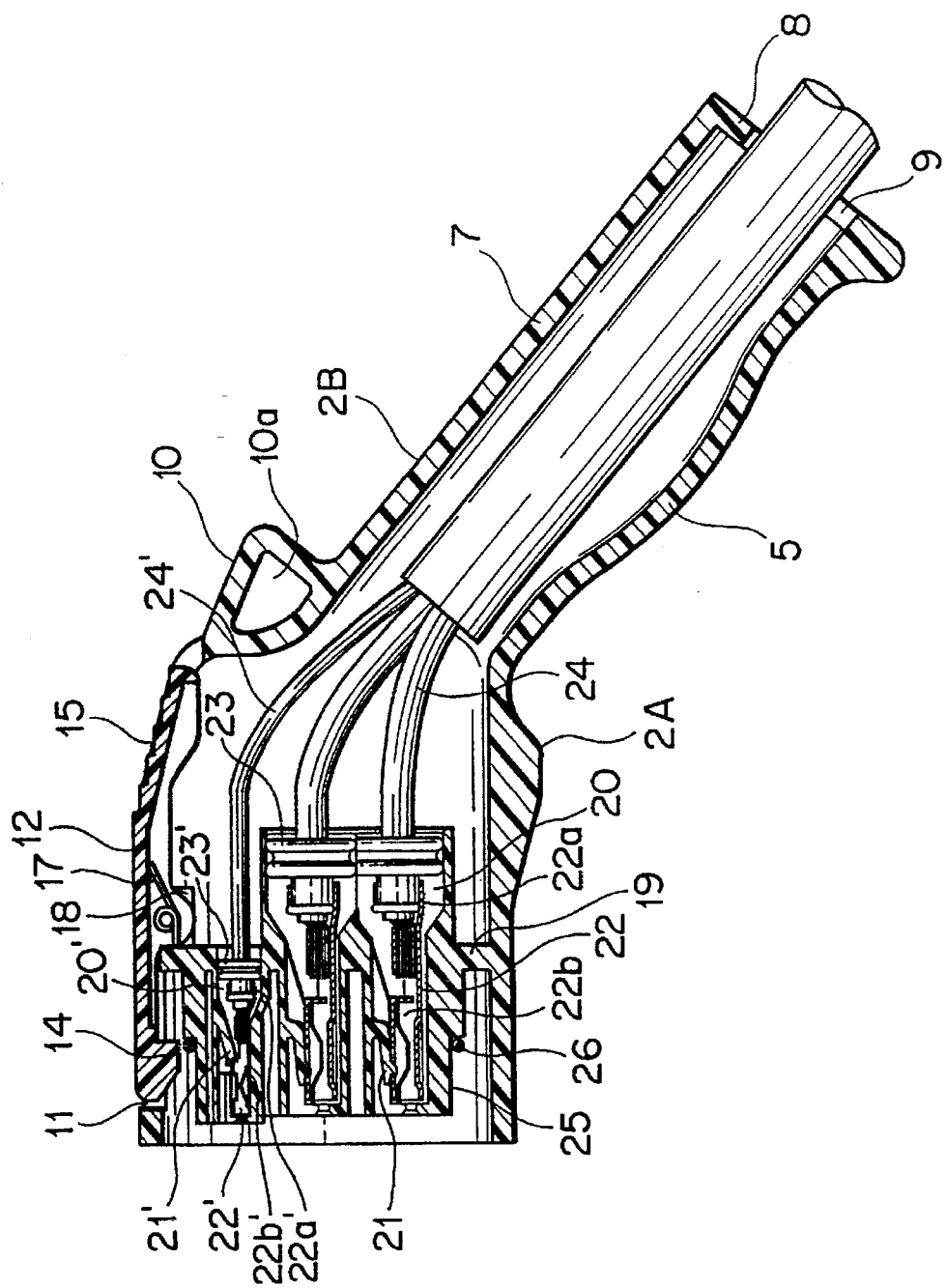
FIG. 4 is a vertical cross section of the feeding side connector A of FIG. 1.

As shown in FIGS. 1 through 5, the feeder connector consists of a feeding side connector A installed on the side of the power supply apparatus not shown and a receiving side connector B secured to an automotive body.

The feeding side connector A comprises a connector body 1 and a protective case 2. The protective case 2 is divided into two parts—a main case 2A and a subcase 2B. The main case 2A consists of a cylinder portion 3 accommodating the connector body 1, a half-cylinder portion 4 formed integral with the cylinder portion 3 with its upper half open, and a trough portion 5 that extends integrally from the half-cylinder portion 4 at an angle. The subcase 2B is formed as a cover which has a cylinder cover portion 6 and a trough cover portion 7 corresponding to the half-cylinder portion 4 and the trough portion 5, respectively. The trough portion 5 and the trough cover portion 7 form a handle of the feeding side connector A. At the terminal end of the trough cover portion 7 is provided a blank plate 8 having a notch 9 for passing wires.

Designated 10 is a hook portion having a suspension hole 10a. The hook portion 10 serves as a stress receiver when a worker grips the handle to couple the feeding side connector A and the receiving side connector B. The suspension hole 10a is provided to allow the connector body 1 to be suspended from a hook.

At facing edges of the half-cylinder portion 4 and the cylinder cover portion 6 where the main case 2A and the subcase 2B are joined, there are provided projections 4a and recesses 6a that receive the projections 4a. Engagement between the projections 4a and the recesses 6a as the subcase 2B is slid on the main case 2A ensures their easy positioning.

Fixing of the main case 2A and the subcase 2B may be accomplished by abutting a fixing piece (not shown) projecting from the outer walls of the half-cylinder portion 4 and the trough portion 5 against a mating fixing piece of the cylinder cover portion 6 and the trough cover portion 7 and then tightening them together by screwing.

The protective case 2 has an opening 11 extending through the cylinder portion 3 of the main case 2A and the cylinder cover portion 6 of the subcase 2B. In this opening 11 there is pivotally mounted a lock lever 12 for the receiving side connector B.

That is, the cylinder portion 3 is formed at its top portion with a rectangular notch 11a extending from the rear edge thereof. The cylinder cover portion 6 is formed with a wide notch 11c, which extends from the front edge thereof through a notch 11b having the same width as the notch 11a. These notches 11a–11c form the opening 11. The connector body 1 has at a rear half of its circumferential portion a pair of lugs 18, 18 projecting toward the notch 11b. The lugs 18, 18 have a pin hole 18a through which is inserted a lock pin 16 that rotatably supports a fulcrum portion 13 formed at the center of the underside of the lock lever 12. A return spring 17 is fitted over the lock pin 16 to push up a manipulating portion 15 at the rear half of the lock lever 12, thereby urging a locking claw 14 at the front end toward the connector body 1.

As shown in a second embodiment described later, it is possible to provide a locking hole, instead of the locking claw 14, in the lock lever 12 and to form a locking claw on the receiving side connector B that engages in the locking hole.

On the rear half of the circumferential portion of the connector body 1 a flange 19 is formed in addition to the lugs 18, 18. Through this flange 19 the connector body 1 and the cylinder portion 3 of the main case 2A are formed integral.

The connector body 1 has three large terminal accommodating chambers 20 and three small terminal accommodating chambers 20'. The large terminal accommodating chambers 20 accommodate power line female terminals 22 and the small terminal accommodating chambers 20' accommodate signal line female terminals 22'. These female terminals 22, 22' are locked from coming off backwardly by resilient locking arms 21, 21', respectively, provided in the terminal accommodating chambers. Wires 24, 24' connected to the female terminals 22, 22' are caulked and secured to wire connecting portions 22a, 22a' at the rear end of the terminals along with water-proof rubber plugs 23, 23', pass through the handle portion formed by the trough portion 5 and the trough cover portion 7 of the protective case 2 and then are drawn out from the notch 9 of the blank plate 8 at the rear end.

The front end portion of the circumferential wall of the connector body 1 is formed as a recessed wall 25 having a step, over which a cap 27 is fitted through a water-proof O-ring 26. The cap 27 is formed with male terminal insertion holes 28, 28' that correspond to the terminal accommodating chambers 20, 20'.

On the outer circumference of a connector body 32 of the receiving side connector B that accommodates and locks male terminals 31, 31' is formed a bulged shell 33, which is fitted into an annular space between the cylinder portion 3 and the connector body 1 of the feeding side connector A. This shell 33 is fixed by fastening a circumferential flange 34 to the car body (not shown) by bolts. Designated 35, 35' are male terminal accommodating chambers, 36, 36' resilient locking arms, and 37, 37' water-proof rubber plugs. The male terminals 31, 31' are locked by the resilient locking arms 37, 37' in a way similar to that of the feeding side connector A.

On the outer circumference of the receiving side connector B is formed a guide groove 38 running axially from the connector body 32 to the shell 33. Formed at the front end portion of the guide groove 38 is an engagement portion 39 that engages with the locking claw 14 of the lock lever 12.

While the above embodiment concerns a case where the feeding side connector A uses the female terminals 22, 22' and the receiving side connector B uses the male terminals 31, 31', it is also possible to change the design of the connector bodies 1, 32 so that the female and male terminals can be reversed.

Figure 5:
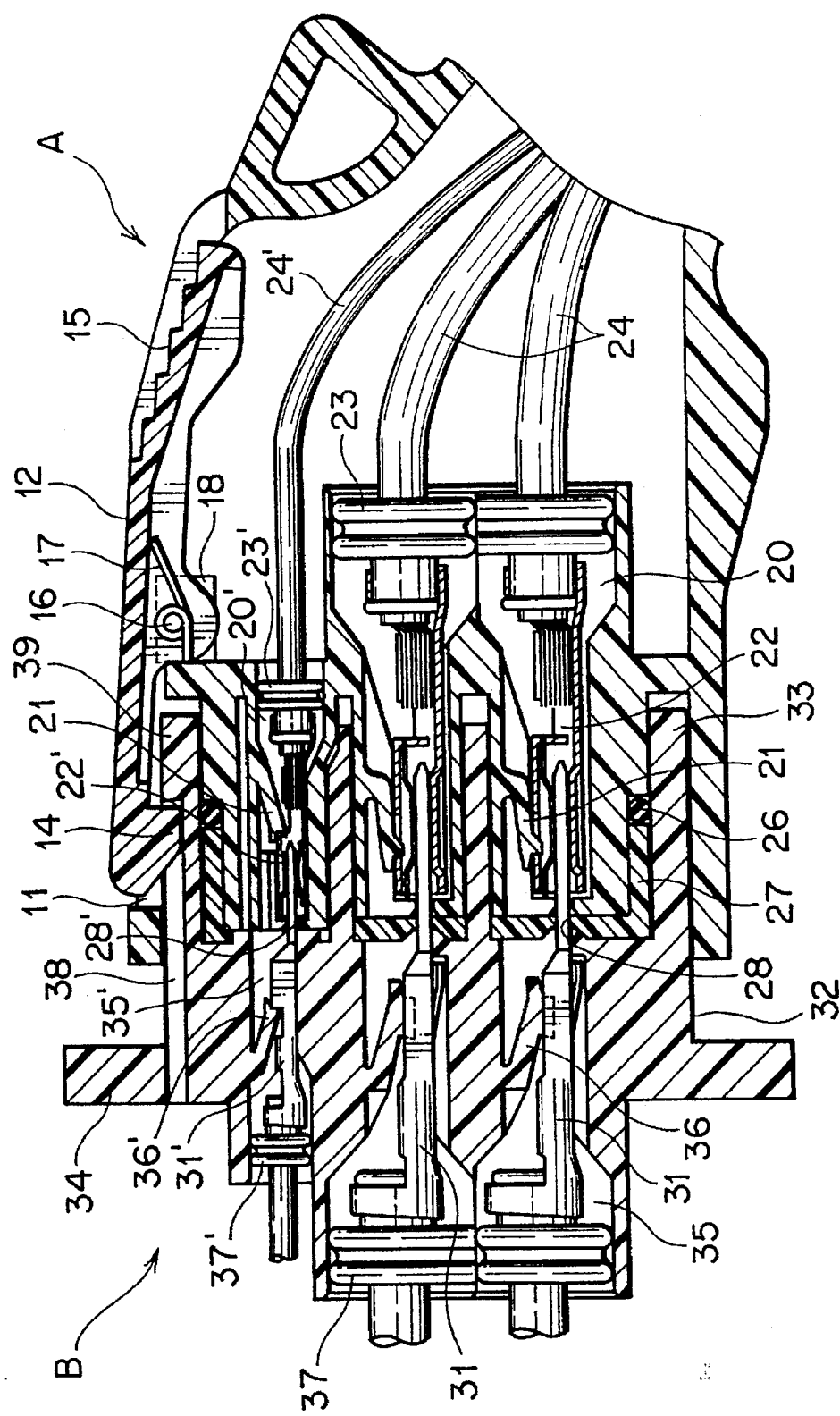
FIG. 5 is a cross section showing the feeding side connector A engaged with a receiving side connector.

Next, by referring to FIG. 5, connection between the feeding side connector A and the receiving side connector B will be explained.

The feeding side connector A is pressed by holding the handle (trough portion 5 and trough cover portion 7) against the receiving side connector B in such a way that the axes of the lock lever 12 and the guide grooves 38 are aligned.

As the shell 33 of the receiving side connector B is received into the annular space between the cylinder portion 3 and the connector body 1 of the feeding side connector A, the both connectors A, B progressively come into engagement with each other. Then, the engagement portion 39 at the front end of the shell 33 contacts the locking claw 14 and further advances pushing up the lock lever 12 against the resilient force of the return spring 17, with the result that the male terminals 31, 31' start to contact electric contact portions 22b, 22b' of the female terminals 22, 22' (see FIG. 4).

When the engagement portion 39 rides over and moves beyond the locking claw 14, the lock lever 12 snaps by the elastic force of the return spring 17, locking the connectors A, B and, at the same time completing the connection between the female and male terminals 22, 31 (22', 31'). The O-ring 26 seals water-tightly between the connector body 1 and the shell 33.

For the control to start and stop the supply of electricity to the feeding side connector A and the receiving side connector B (e.g., opening and closing of a magnetic contactor, and blinking of an alarm lamp), a signal produced by the connection between the female terminal 22' and the male terminal 31' may be used.

Unlocking and disconnection of the connectors A, B can be done very easily as follows. The manipulating portion 15 of the lock lever 12 is pushed down to disengage the locking claw 14 from the engagement portion 39, after which the handle is pulled toward the assembly worker.

Figure 6:
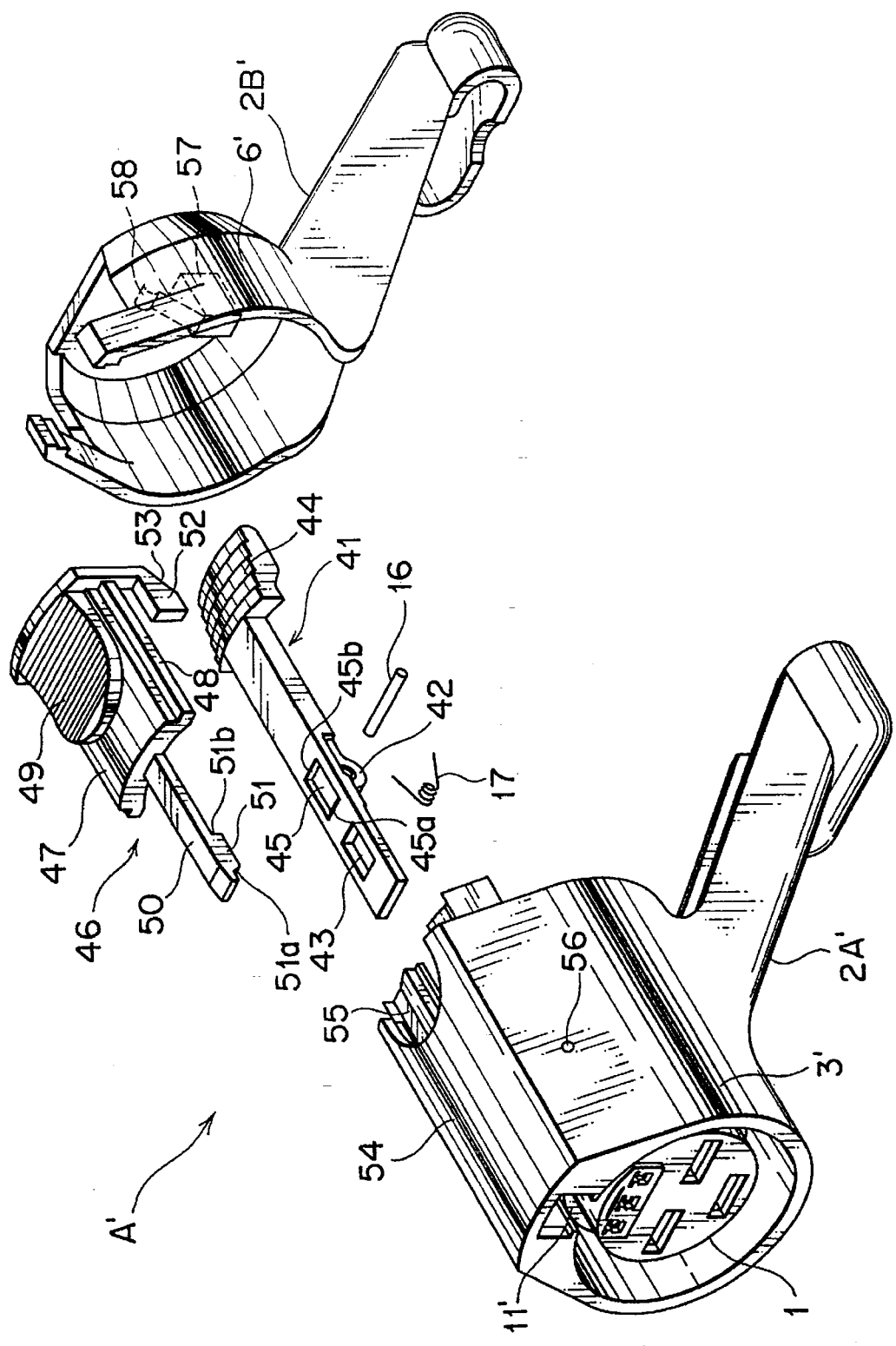
FIG. 6 is an exploded perspective view of the feeding side connector A' as a second embodiment of this invention.
Figure 7:
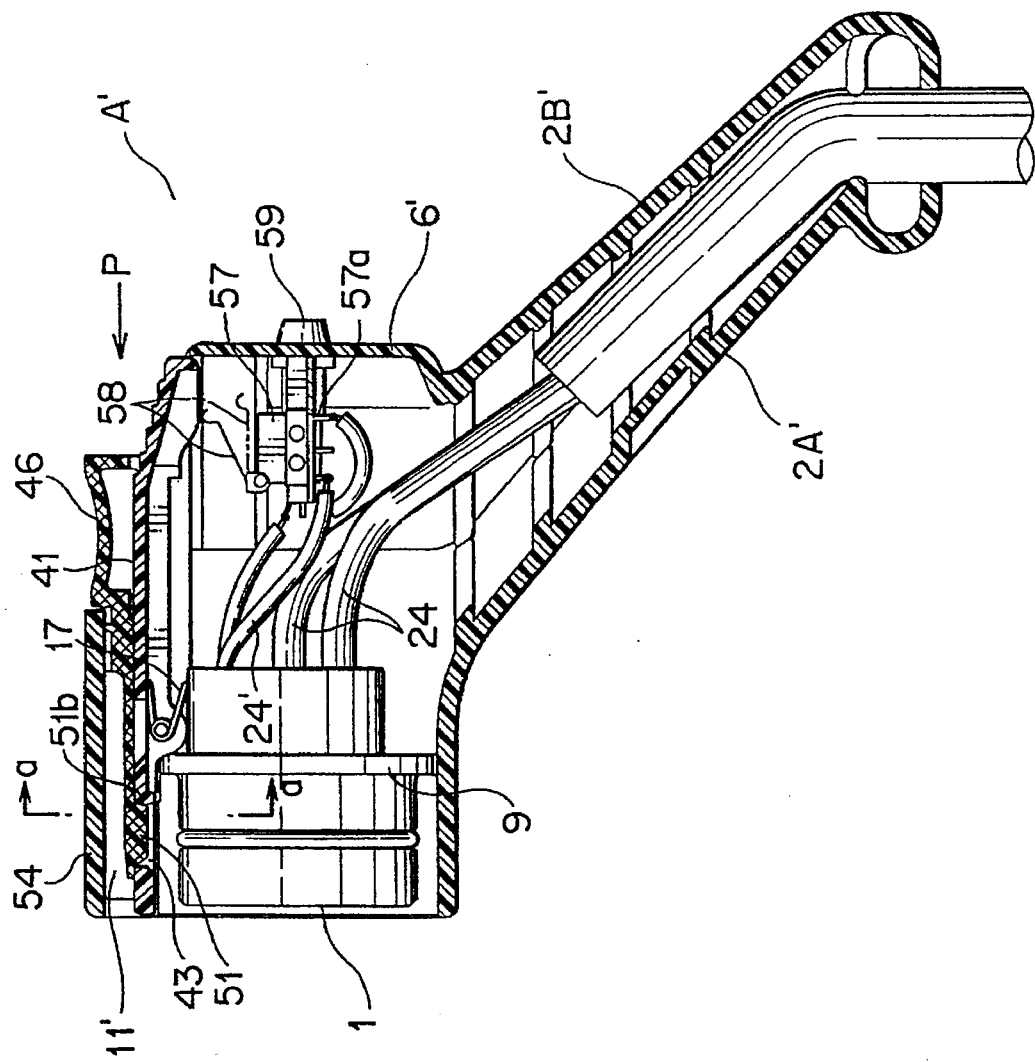
FIG. 7 is a vertical cross section of the feeding side connector of FIG. 6 in an assembled state.
Figure 8:
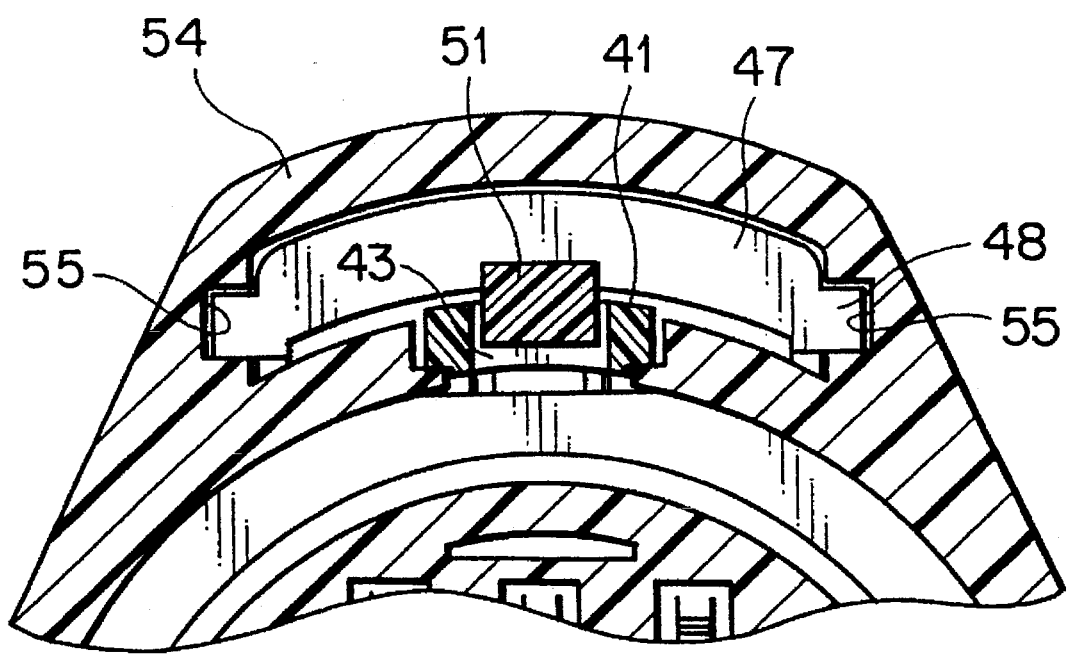
FIG. 8 is a cross section of an essential portion of FIG. 7.

FIG. 6 shows a perspective exploded view of a second embodiment of the feeding side connector according to this invention. FIG. 7 is a vertical cross section of an essential portion of FIG. 6 in an assembled state. FIG. 8 is a cross section taken along the line a—a of FIG. 7. Components similar to those of the first embodiment are assigned like reference numerals with or without a prime symbol, and their detailed explanations are omitted.

In these figures, denoted A' is a feeding side connector, 41 a lock lever, 46 a slider for checking the locking, and 54 a slider accommodating chamber. The slider accommodating chamber 54 is shaped like an arch with the front and rear open and bulges integrally from a cylinder portion 3' of a main case 2A' in such a way as to enclose an opening 11' in the cylinder portion 3'. The slider accommodating chamber 54 has guide grooves 55 on the inner surfaces of side walls to receive the slider 46.

The lock lever 41 has a fulcrum portion 42 at the center on its underside, a locking hole 43 formed in front of the fulcrum portion 42, and a manipulating portion 44 at the rear. The fulcrum portion 42 is rotatably supported in the cylinder portion 3' by a lock pin 16 with a return spring 17 fitted thereover. Denoted 56 is a hole for the lock pin 16. The lock lever 41 is rotatably supported at the opening 11' in the same way as the first embodiment, except that it is provided with a second locking hole 45 behind the locking hole 43. The locking hole 45 is formed as a so-called, "semi-locking" hole, whose front edge is an upwardly expanding inclined surface 45a and rear edge is a vertical surface 45b.

On the outer circumference of the receiving side connector B' is formed a locking claw 60, instead of the engagement portion 39, that engages with the locking hole 43.

The slider 46 comprises: guide strips 48 projecting from both sides of a saddle-shaped body 47 and adapted to slidably engage the guide grooves 55 of the slider accommodating chamber 54; a manipulating portion 49 on the top of the body 47; a resilient lock piece 50 in front of the body 47; and a drive piece 52 formed integral with the body 47 below the rear part of one guide strip 48 and adapted to drive a microswitch 57 described later. The resilient lock piece 50 has a locking claw 51 at the front end, whose front side is an upwardly expanding inclined surface 51a following the shape of the locking hole 45 and whose rear side is a vertical surface 51b. At the rear end of the drive piece 52 is formed a drive inclined surface 53.

The cylinder cover portion 6' of the subcase 2B' has a water-proof microswitch 57 secured on the inner surface of the rear wall thereof and, on its outer surface, an LED 59 that blinks as a hinge lever 58 is held flat and raised.

Figure 11A:
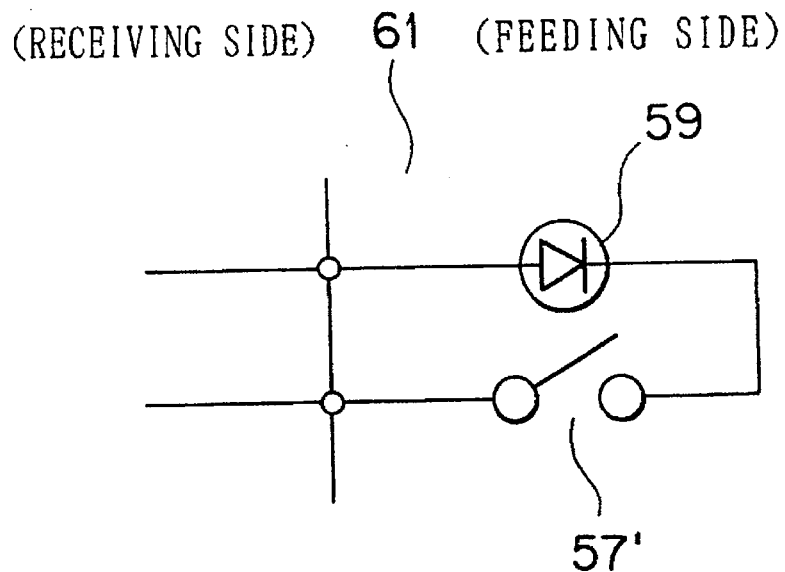
FIGS. 11A and 11B repesent a circuitry of a detecting circuit for detecting the engaged state of the feeding side connector A and the receiving side connector B.
Figure 11B:
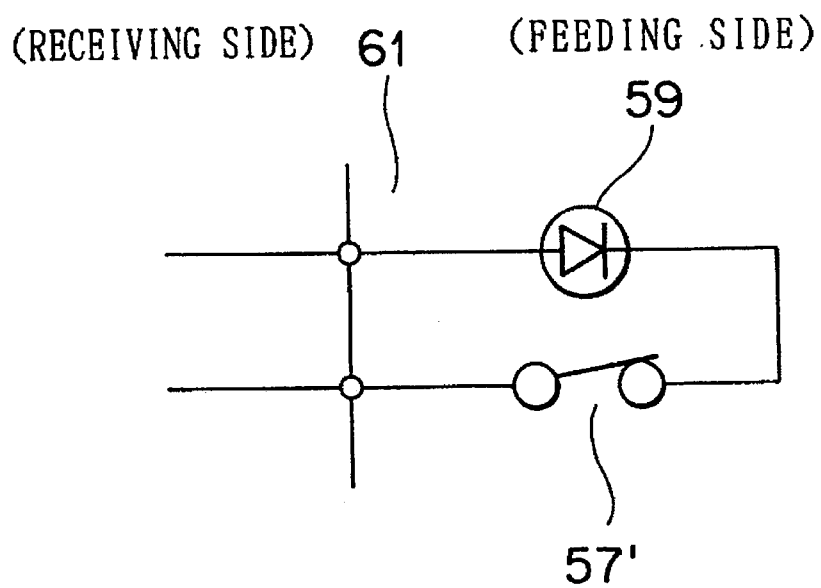
Figure 12:
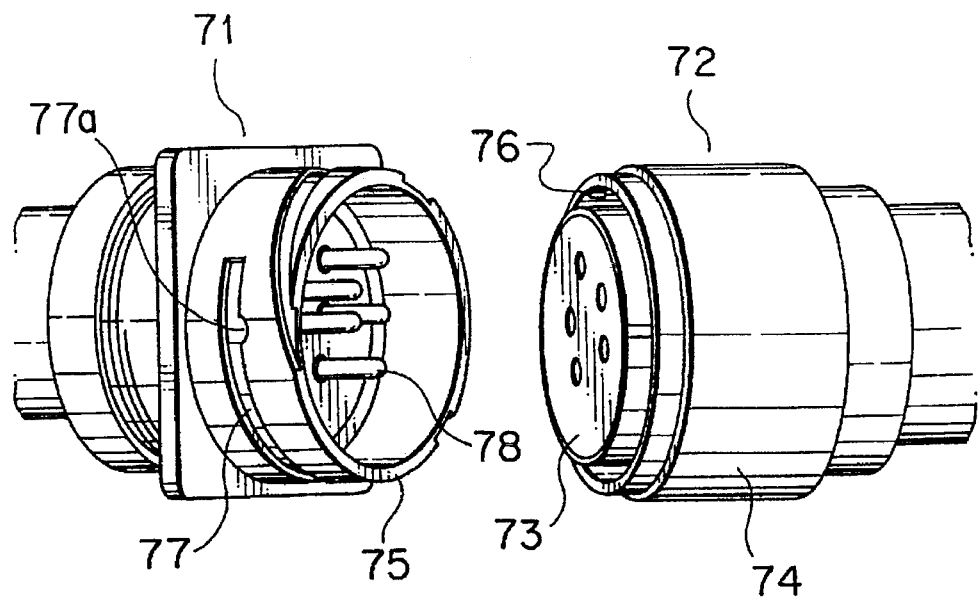
FIG. 12 is a perspective view of a conventional feeder connector in a disconnected state.
Figure 13:
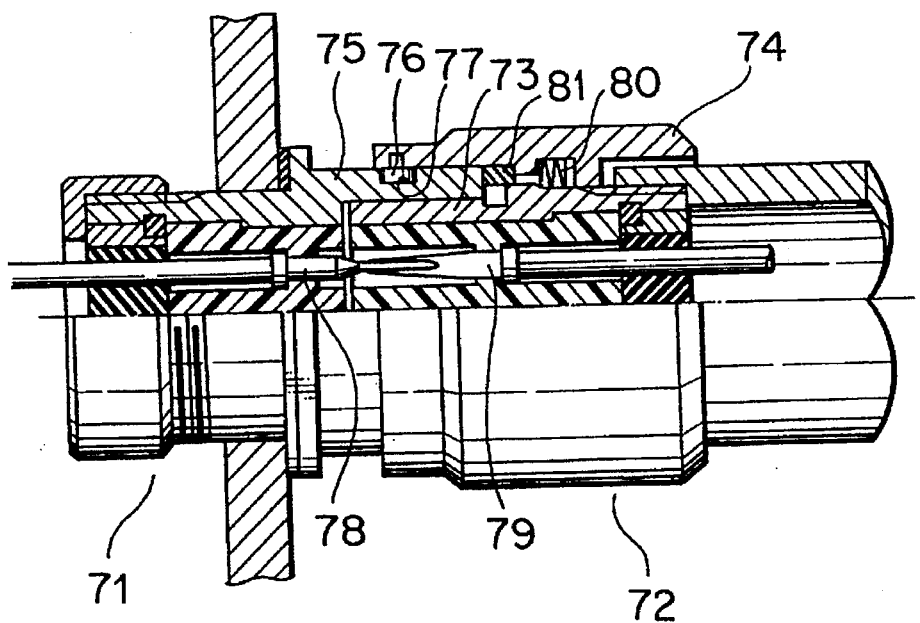
FIG. 13 is a vertical cross section of FIG. 12 in a connected state.

A plurality of connection terminals 57a of the microswitch 57 are connected with connecting wires 24' of the signal line female terminals 22' of the connector body 1 (see FIG. 4) to form a detection circuit 61 for detecting the locked state of the feeding side connector A' and the receiving side connector B', as shown in FIGS. 11A and 11B.

Next, how the feeding side connector A' equipped with the slider 46 is used will be described by referring to FIGS. 9 and 10.

As shown in FIG. 7, with the feeding side connector A' not used, when the slider 46 is pushed into the slider accommodating chamber 54 in the direction of arrow P, the guide strips 48 of the slider 46 advance guided by the guide grooves 55 (see FIG. 8), causing the locking claw 51 at the front end to engage the locking hole 43 of the lock lever 41. This is a preliminary locking state.

The rear edge of the locking hole 43 works as a return-prevention stopper for the rear vertical surface 51b of the locking claw 51, so that the slider 46 cannot easily be pulled off if it is attempted to pull the slider 46 in a direction opposite to the arrow P.

FIG. 9 shows a state in which the feeding side connector A' and the receiving side connector B' are engaged and in which the female and male terminals 22, 31 (22', 31') are completely connected.

In this completely engaged state, the locking claw 60 of the receiving side connector B' engages the locking hole 43 of the lock lever 41 to lock the feeding and receiving side connectors A', B'. As a result of this locking action, the locking claw 60 pushes up the locking claw 51 of the resilient lock piece 50 of the slider 46, thus canceling the preliminary locking of the slider 46, so that the slider 46 can be advanced and retracted in the slider accommodating chamber 54.

In this state, when the slider 46 is retracted in the direction of arrow Q by a finger, as shown in FIG. 10, the locking claw 51 engages the second locking hole 45 of the lock lever 41 to fully lock the mating connectors. At the same time, the drive inclined surface 53 at the rear end of the drive piece 52 of the slider 46 presses against the hinge lever 58 of the microswitch 57. This turns on a switch contact 57' of the detection circuit 61 lighting the LED 59.

The lighting of the LED 59 acknowledges the full engagement and locking between the feeding side connector A' and the receiving side connector B', as well as providing a supply of electricity.

As described in the first embodiment, because the feeding side connector A' has three signal line female terminals 22', one of these terminals can be used for a control circuit which starts feeding of electric power when the microswitch 57 turns on.

As can be seen from FIG. 9, when the engagement between the feeding side connector A' and the receiving side connector B' is not complete, the preliminary locking of the slider 46 and the lock lever 41 is not canceled, so that the slider 46 cannot be slid backwardly, as shown in FIG. 10. This forestalls an incomplete engagement of the mating connectors. The provision of the above-mentioned control circuit can prevent supply of electricity in an incompletely connected state.

Further, after power feeding is over, i.e., when the slider 46 is in a fully locked state, strongly pushing the slider 46 forwardly in a direction opposite to the arrow Q of FIG. 10 disengages itself because of the semi-lock type structure of the locking claw 51 and locking hole 45 (inclined surfaces 45a and 51a). Hence, the slider 46 can be advanced forwardly. When the slider 46 reaches a position shown in FIG. 9, pushing down the manipulating portion 44 of the lock lever 41 disengages the locking hole 43 and the locking claw 60, as in the first embodiment. Now, the feeding side connector A' can be pulled from the receiving side connector B'.

With the second embodiment, the use of the slider 46 that moves relative to the lock lever 41 between the preliminary locked position and the fully locked position makes it possible to check the full engagement and locking between the feeding side connector A' and the receiving side connector B'. Further, the provision of the switching means that is activated when the slider 46 is moved to the fully locked position allows checking of the engagement and power feeding state.

As described above, the feeder connector according to this invention comprises:

a feeding side connector installed on a power supply apparatus side; and a receiving side connector installed on a car body side; wherein the feeding side connector comprises:

a connector body accommodating a plurality of terminals;

a protective case accommodating the connector body; and a lock lever for the receiving side connector;

wherein the protective case comprises:

a main case including a cylinder portion accommodating the connector body, a half-cylinder portion formed integral with the cylinder portion and having its upper half open, and a trough portion extending integrally from the half-cylinder portion at an angle;

a subcase covering the half-cylinder portion and the trough portion; and an opening ranging from the cylinder portion of the main case;

wherein the connector body is integrally formed with the cylinder portion of the main case through a flange formed along the periphery of the connector body, and the lock lever for the receiving side connector is provided in the opening.

Because of this construction, it is possible the reliably prevent an incomplete connection of the mating connectors and to allow simple one-touch connection and disconnection of female and male connectors.

Because the slider is used that moves relative to the lock lever between the preliminary locked position and the fully locked position, the check of full engagement and locking state of the mating connectors becomes easy, reliably preventing incomplete connection. Furthermore, because the slider is used to activate the switching means to blink a light, the full engagement and locking state can be electrically verified.

What is claimed is:

1. An electrical connector including:

a feeding side connector installed on a power supply apparatus side; and a receiving side connector installed on a car body side, wherein the feeding side connector comprises:

a connector body accommodating a plurality of terminals:

a protective case enclosing the connector body; and a lock lever pivotally attached through said feeding side connector by a locking pin for locking with said receiving side connector, said protective case containing:

a lower main case including a cylinder portion accommodating the connector body, a first half-cylinder portion open at its upper half and formed integral with the cylinder portion, and a first trough portion extending downwardly and integrally formed with the first half-cylinder portion at an angle;

an upper subcase having a second half cylinder cover, a second trough portion for covering said first half-cylinder and said first trough portion of said lower main case and;

an opening extending from said upper half of said first half cylinder portion of said lower main case to an upper half of said second half of the upper subcase to receive said lock lever and enable pivoted movement of said lock lever with respect to said main case, wherein the connector body is integrally formed with the cylinder portion of the main case through a flange formed along the periphery of the connector body, and the lock lever is pivotally attached within the opening for locking the receiving side connector.

2. An electrical connector as claimed in claim 1, wherein the lower main case is formed with an arc-shaped slider-accommodating chamber enclosing the opening; a slider is mounted in the slider accommodating chamber so that the slider can be advanced or retracted relative to the lock lever between a preliminary locked position and a fully-locked position, and including engagement means cooperably disposed on said slider and said lock lever and operative to permit mutual engagement between said slider and said lock lever when the feeding side and receiving side connectors are incompletely engaged and said slider is in said preliminary locked position, and means operative to permit disengagement of said slider from said lock lever when said slider is moved to said fully locked position for manipulation of sad lock lever to attach said receiving side connector when said connectors are completely engaged.

3. An electrical connector as claimed in claim 2, wherein the engagement means includes a locking claw formed on the slider and first and second longitudinally spaced holes formed in the lock lever for receiving said claw, and wherein, when the feeding side and receiving side connectors are completely engaged and said slider is in said preliminary locked position, engagement between the claw and the first hole is released and the slider is slidable to said fully locked position in which the claw is engaged with the second hole.

4. An electrical connector as claimed in claim 2 or 3, wherein the protective case includes an indication means that blinks upon reception of a switch signal and means that is activated by the slider moving to the fully locked position to produce said switch signal.

* * * * *